United States Patent [19]

Sargisson

[11] 4,030,291
[45] June 21, 1977

[54] THRUST REVERSER FOR A GAS TURBOFAN ENGINE

[75] Inventor: Donald Farley Sargisson, Cincinnati, Ohio

[73] Assignee: General Electric Company, Lynn, Mass.

[22] Filed: Jan. 2, 1976

[21] Appl. No.: 646,074

[52] U.S. Cl. ............................. 60/226 A; 60/230; 239/265.29; 239/265.31; 60/262
[51] Int. Cl.² .................... F02C 3/06; F02K 3/06; F02K 1/20
[58] Field of Search ............... 60/226 A, 262, 230; 239/265.27, 265.29, 265.31

[56] References Cited
UNITED STATES PATENTS

| | | | |
|---|---|---|---|
| 3,262,270 | 7/1966 | Beavers | 60/226 A |
| 3,508,403 | 4/1970 | Neitzel | 60/262 |
| 3,600,894 | 8/1971 | McClain | 60/226 A |
| 3,603,090 | 9/1971 | Billinger et al. | 60/226 A |
| 3,608,314 | 9/1971 | Colley | 60/226 A |

*Primary Examiner*—Carlton R. Croyle
*Assistant Examiner*—Robert E. Garrett
*Attorney, Agent, or Firm*—James W. Johnson, Jr.; Derek P. Lawrence

[57] ABSTRACT

In a mixed flow gas turbine engine of the type which includes an outer nacelle spaced apart from a core engine to define an annular bypass duct therebetween, a thrust reverse is incorporated into the outer nacelle immediately aft of a fan disposed in the inlet. The thrust reverser reverses the discharge direction of the airflow exhausted from the bypass duct thereby to develop reverse thrust. The unique design and location of the thrust reverser permits the use of an aerodynamically efficient and relatively easy to manufacture cylindrical structure immediately aft of the engine fan frame.

1 Claim, 5 Drawing Figures

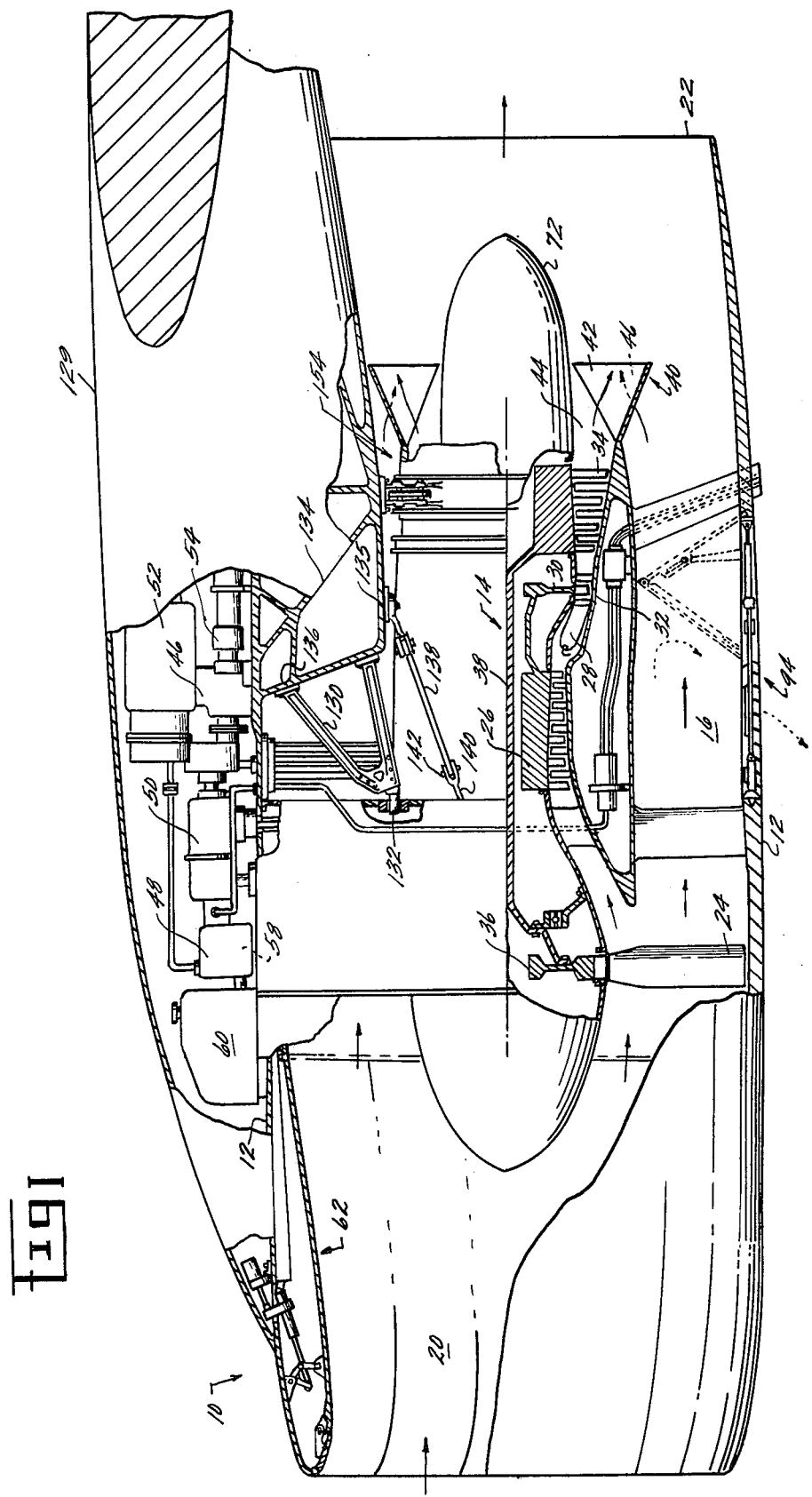

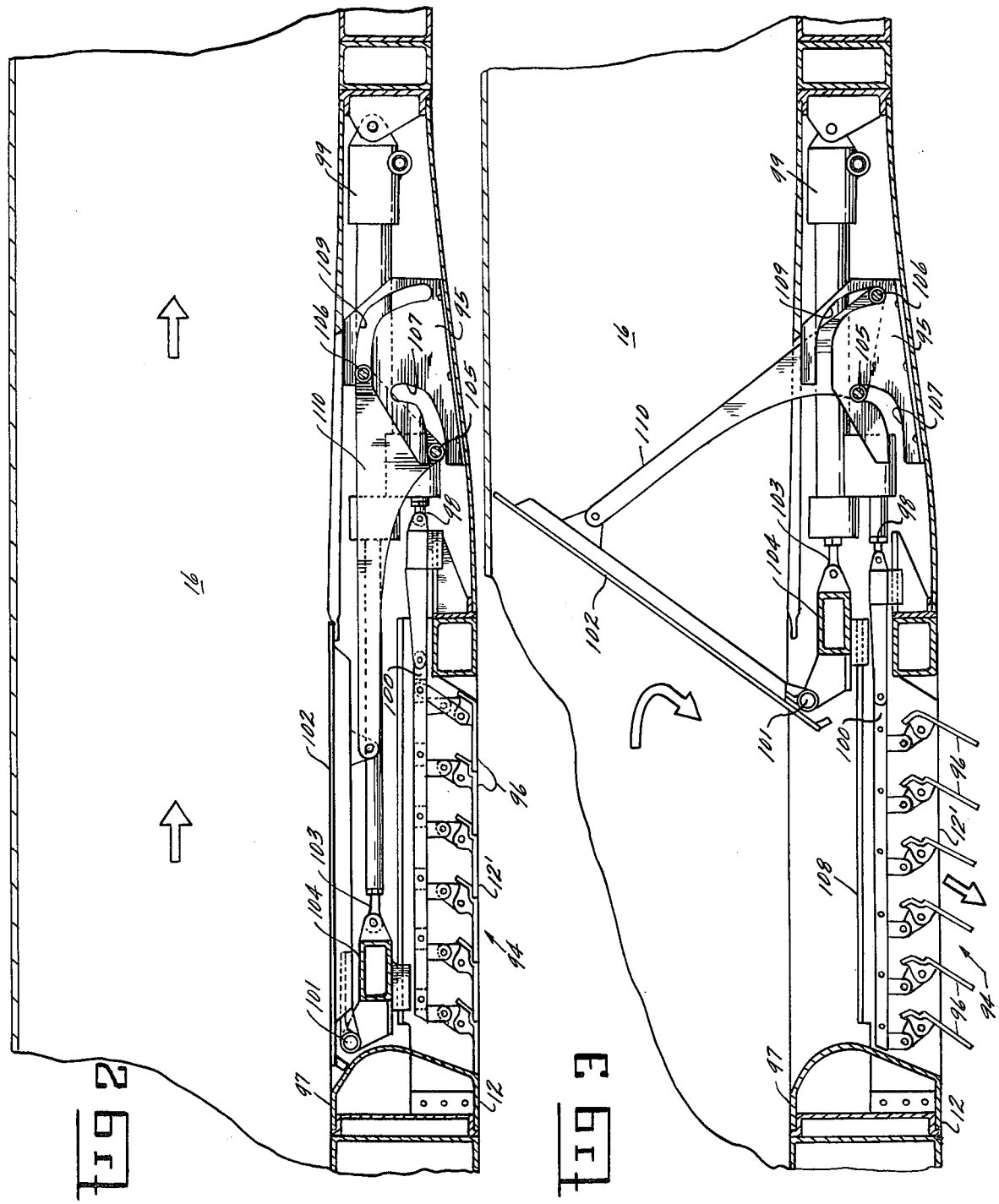

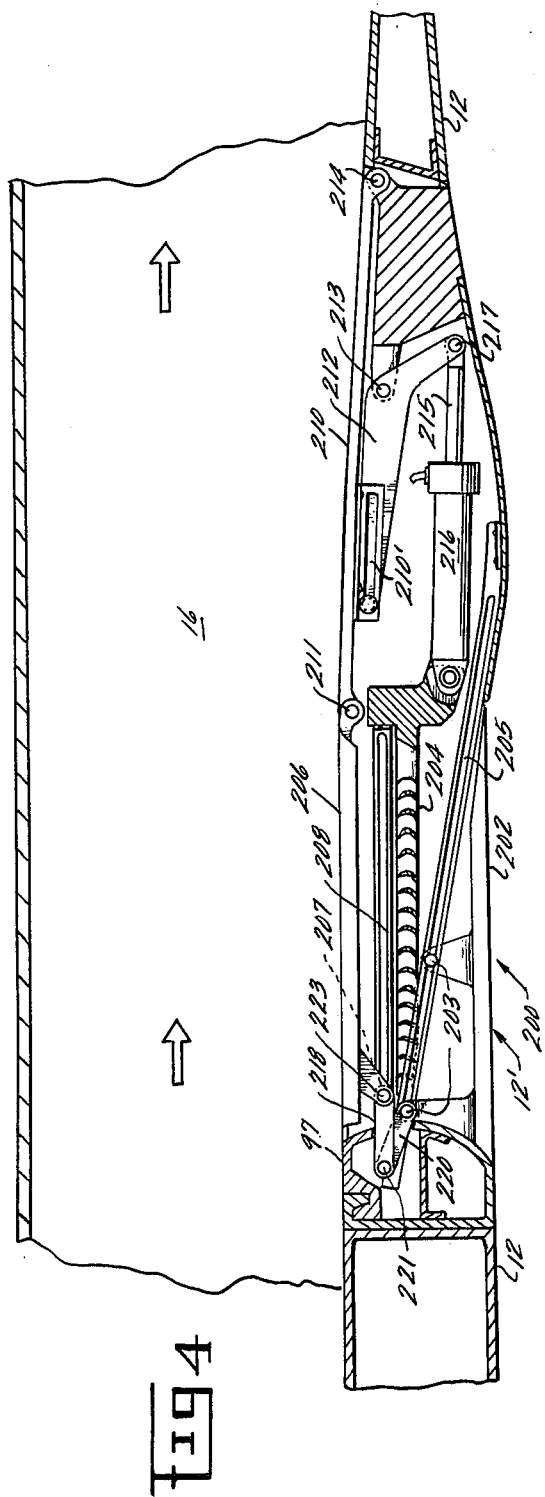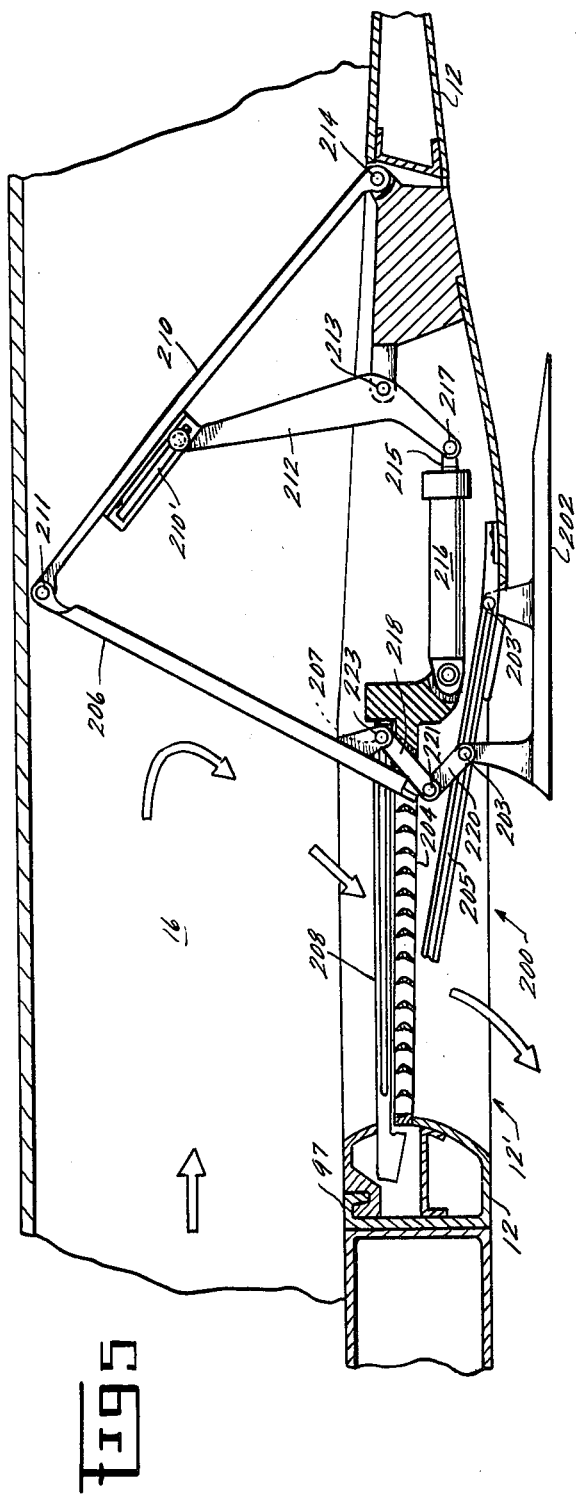

THRUST REVERSER FOR A GAS TURBOFAN ENGINE

Cross-References to Related Applications

This application is being filed concurrently with U.S. application Ser. No. 646,326, assigned to the pending assignee of the present invention which discloses and claims a generic invention of which the invention disclosed and claimed herein is a species thereof.

BACKGROUND OF THE INVENTION

The present invention relates to improvements in gas turbine engines and nacelles therefor and, more particularly, to a novel gas turbofan engine which exhibits lower noise levels, improved fuel comsumption, greater reliability, easier maintainability, easier replaceability, and improved thrust reversal over prior art gas turbofan engines.

Considerable attention has been devoted to developing a gas turbine engine which is quiet, clean and economical to operate. Significant improvement has been made in fuel consumption and noise levels of gas turbine engines over the past decade. Accordingly, a new family of high bypass, large diameter turbofans has recently been introduced into service. These engines have demonstrated noise levels and fuel consumption characteristics far superior to prior art gas turbine engines.

One of the operational requirements of such aircraft gas turbine engines is that of quick reversal from forward to reverse thrust for breaking purposes after landing. Accordingly, such engines have included various schemes for reversing the forward thrust delivered by the engine. In conventional high bypass engines, this has generally been accomplished by the use of blocker doors and other apparatus for reversing the exhaust direction of the bypass stream. In addition to reversing the bypass stream exhaust direction, such engines have also had to employ mechanisms for reducing the forward thrust of the core engine. Accordingly, they have included core engine exhaust flow thrust spoilers or thrust reversers in addition to the bypass stream reversers.

It is, therefore, a primary object of the present invention to provide an economical, easily maintained gas turbofan engine with improved thrust reversal.

SUMMARY OF THE INVENTION

This and other objects are achieved in the preferred embodiment of this invention in which a gas turbofan engine is provided with an outer nacelle which forms both the engine inlet and exhaust. The nacelle is spaced apart from a core engine to define an annular bypass duct therebetween. The incoming air stream is pressurized by a fan disposed in the inlet and thereafter divided between the core engine and bypass duct. A low pressure turbine is provided downstream of the core engine to supply rotational energy to the fan. A convoluted lobed mixer having a plurality of circumferentially spaced alternating cold chutes in flow communication with the bypass duct and hot chutes in flow communication with the core engine is provided downstream of the low pressure turbine to intermix the core engine and bypass duct exhaust streams. The mixed stream is thereafter discharged from a fixed area nozzle formed integral with the outer nacelle.

A thrust reverser system is provided upstream of the core engine and downstream of the fan. The thrust reverser system reverses the discharge direction of the airflow exhausted from the bypass duct in order to reduce the forward thrust of the engine. An additional reverse thrust bonus is provided by the engine due to the creation of reduced pressure relative to ambient at the mixer exhaust when the bypass flow is reversed and because upon reversal of the bypass flow the hot gas stream becomes over-expanded, thereby losing a very substantial portion of its propulsive effectiveness as it is discharged through the common exhaust nozzle, which has an area at these flow conditions far in excess of that which would be used for an efficient propelling nozzle. Because of the additional reverse thrust bonuses, sufficient reverse thrust can be achieved in the engine of this invention without the use of core engine thrust reversers or spoilers. The unique design and location of the thrust reverser permits the engine of this invention to utilize an aerodynamically efficient and relatively easy to manufacture cylindrical structure immediately aft of the engine fan frame. Normally, a cylindrical structure cannot be incorporated in this part of the engine because of the difficulty in satisfying all of the mechanical and aerodynamic requirements for the incorporation of a bypass stream thrust reversing system.

BRIEF DESCRIPTION OF THE DRAWINGS

The invention may be better understood upon reading the following description of the preferred embodiment in conjunction with the accompanying drawings in which:

FIG. 1 is a cross-sectional view of a gas turbofan engine incorporating the thrust reverser of this invention.

FIG. 2 is an enlarged view of the thrust reverser of this invention in a closed position.

FIG. 3 is an enlarged view of the thrust reverser of FIG. 2 in an open position.

FIG. 4 is an enlarged view of an alternate embodiment for the thrust reverser of this invention in a closed position.

FIG. 5 is an enlarged view of the thrust reverser of FIG. 4 in an open position.

DESCRIPTION OF THE PREFERRED EMBODIMENT

Referring to FIG. 1 there is shown a mixed flow gas turbine engine 10 having an outer casing or nacelle 12 spaced apart from an inner core engine shown generally at 14 so as to define an annular bypass duct 16 therebetween. The outer nacelle 12 extends upstream of the core engine 14 to define an inlet 20 to the engine 10 and downstream of the core engine 14 to define a fixed area exhaust nozzle 22 for the engine 10. Disposed in the engine inlet 20 is a fan 24 for pressurizing the total inlet airflow.

In operation, the fan 24 pressurizes the incoming air stream which is thereafter divided between the core engine 14 and the bypass duct 16. The airflow to the core engine 14 is further compressed by a core engine compressor 26 to provide a highly pressurized air stream for supporting combustion of fuel in a combustor 28. The hot gas stream generated by the combustor 28 is used to drive a high pressure turbine 30 which is connected to the rotor of the compressor 26. The hot gas stream discharged from the high pressure turbine 30 passes through an outwardly curved annular duct 32 to a low pressure turbine 34, which is connected to and drives the rotor 36 of the fan 24 through an upstream extending drive shaft 38. Disposed downstream and in flow communication with the low pressure turbine 34 and bypass duct 16 is a convoluted lobed mixer 40 circumscribing an exhaust plug 72 and having a plurality of circumferentially spaced alternating hot chutes 42 in flow communication with the low pressure turbine discharge nozzle 44 and cold chutes 46 in flow communication with the bypass duct 16. The combined flows are thereafter discharged through the fixed area nozzle 22 formed integral with the outer nacelle 12. The mixer 40 is generally of the type described in U.S. patent number 3,508,403, which is designed to reduce aerodynamic pressure losses as the fan and hot gas streams commingle.

In order to provide for ease in service and accessibility of engine accessories, provisions have been made for mounting the engine accessories exterior to the outer nacelle 12. Accordingly, most of the engine accessory components including the fuel pump 48, generator 50, starter 52, hydraulic pump 54, heat exchanger 46, ignition unit 58, and storage tank 60 are mounted exterior to the outer nacelle 12.

In order to minimize fan noise during takeoff and climb-out, the inlet 20 to the engine 10 upstream of the fan 24 is provided with a variable geometry mechanism shown generally at 62 for changing the cross-sectional flow area of the inlet 22 as more fully described in U.S. patent application Ser. No. 646,075, filed concurrently herewith and assigned to the assignee of this invention.

Engine noise is further suppressed by constructing the entire nacelle 12 of a thin wall honeycombed structure which is acoustically absorbent. Engine noise is further reduced by providing an acoustically absorbent lining on the exhaust plug 72.

In order to provide a high level of reverse thrust, a plurality of thrust reversers, shown generally at 94, are circumferentially spaced around the engine immediately aft of the engine fan frame. Each thrust reverser 94, as best seen in FIGS. 2 and 3, includes a plurality of cascaded turning chutes 96 operated by a suitable linear actuator 98 through an arm 100. A second linear actuator 99 is provided to operate the blocker door 102. The actuator 99 includes a control arm 103 which operates the door 102 through a bracket 104 pivotally engaging the upstream end of blocker door 102 at a hinge point 101. The upstream end of the blocker door 102 is pivotally mounted to the downstream end of an arm 110. The opposite end of the arm 110 includes a pair of rollers 105 and 106 which slidingly and rotatably engage respective cam tracks 107 and 109 formed integral with bracket 95 which is secured to the nacelle 12. Upstream movement of the actuator arm 100 causes opening of the cascaded turning chutes 96. Similarly, upstream translation of the control arm 103 causes deployment of the blocker door 102 as illustrated in FIG. 3 so as to redirect the bypass duct flow through the curved chutes 96 and thereby develop reverse thrust for braking after aircraft landing. Downstream retraction of the actuator arms 100 and 103, as best seen in FIG. 2, causes the blocker door 102 and cascaded chutes 96 to close, thereby permitting the bypass stream to flow uninhibited to the mixer 40. The unique design and location of the thrust reverser 94 permits the engine sidewalls, shown generally at 12', immediately aft of the fan frame 97, to be maintained axially linear and parallel to produce an essentially cylindrical structure rather than diverging radially inward or axially curved as is generally required to meet the aerodynamic requirements of prior art thrust reversal systems. Such generally cylindrical parallel wall structures are significantly less costly to manufacture than the prior art non-parallel or axially curved structures. Adequate thrust reversal is achieved by the bypass flow reverser 94 without the use of core flow spoilers or reversers since an additional reverse thrust bonus will be produced by the engine upon reversal of the bypass flow. When the bypass flow is reversed, the core gas stream becomes over-expanded at the mixer exhaust and thereby loses a very substantial portion of its propulsive effectiveness as it is discharged through exhaust nozzle 22.

Referring to FIGS. 4 and 5, therein is shown an alternate embodiment for the bypass flow reverser of this invention which also permits an essentially cylindrical parallel sidewall structure to be utilized aft of the fan frame 97. Each of the circumferentially spaced reversers shown generally at 200 includes an outer door 202 disposed to cover a plurality of turning vanes 204 in the outer nacelle 12. The outer door 202 includes a pair of rollers 203 which slidingly engage a beam track 205 which diagonally spans the turning vanes 204. The reverser further comprises an annular blocker door 206 having a roller 207 at its upstream end which slidingly engages a second track 208 spaced radially inward from and spanning the vanes 204. The opposite end of the blocker door 206 is pivotally hinged to the upstream end of a support door 210 at a hinge point 211. The downstream end of the support door 210 is pivotally hinged to the engine outer nacelle 12 at a downstream point 214. A bell crank lever 212 has its upstream end mounted in sliding engagement with the support door 210 by means of a track 210 and hinged below its midspan to the outer nacelle 12 at a hinge point 213 and at its downstream end pivotally mounted to the actuating arm 215 of a linear actuator 216 at a hinge point 217. In order to provide an actuation force to the outer door 202, a pair of links 218 and 220 are provided. Link 218 is pivotally mounted to the upstream end of the outer door 202 at a hinge point 223 and also pivotally mounted to one end of the link 220 at a hinge point 221. The other end of link 220 pivotally engages the roller 203 at the upstream end of the blocker door 206. In this manner, translation of the blocker door 206 along the track 205 by the actuator 216 will cause simultaneous translation of the outer door 202 along the track 205. Upstream translation of the arm 215 of the actuator 216 causes the blocker door 206 to move to a deployed position, as shown in FIG. 5, wherein the bypass flow is obtruded. Simultaneously the outer door is moved in the downstream direction to uncover the vanes 204 whereby the bypass flow is directed between the vanes 204 so as to reverse the direction of discharge of the bypass flow and thereby develop reverse thrust. Downstream translation of the actuator arm 215 causes the blocker door 206 and outer door 202 to assume a closed position as illustrated in FIG. 4, wherein the bypass flow in unobtruded.

Having described preferred embodiments of the present invention, though not exhaustive of all equivalents, it will be appreciated by those skilled in the art that many modifications, substitutions and changes may be made thereto without departing from the fundamental theme of the invention. Therefore, what is desired to be secured by Letters Patent is as follows

What is claimed is:

1. A thrust reverser system for a gas turbine engine of the type which includes an outer nacelle spaced apart from a core engine to define an annular bypass duct therebetween and having a fan disposed in the inlet for providing compressed air to the bypass duct and core engine wherein the thrust reverser system is incorporated into the nacelle immediately downstream of the fan and includes a plurality of circumferentially spaced thrust reversers each comprising:

- a passageway through the nacelle having a plurality of turning vanes disposed therein;
- an outer door translatably mounted to the nacelle and movable between an open position wherein the passageway is uncovered and a closed position wherein the passageway is covered and including a plurality of rollers which slidingly engage a beam track diagonally spanning the turning vanes;
- a blocker door disposed to be movable between an open position wherein the bypass duct flow is obtruded by the blocker door at a point downstream of the passageway and a closed position wherein the bypass duct flow is unobtruded by the blocker door, said blocker door including a roller at its upstream end which slidingly engages a second track spaced radially inward from and spanning the turning vanes and having its upstream end also joined to one of the outer door rollers by a pair of pivotally connected links;
- a support door having its upstream end hinged to the downstream end of the blocker door, its downstream end hinged to the nacelle at a point downstream of the turning vanes, and
- linear actuator means for simultaneously moving the outer door and blocker door between their respective open and closed positions, comprising a bell crank lever having its upstream end mounted in sliding engagement with a track disposed on the support door, hinged downstream of its midspan to the outer nacelle at a point upstream of the downstream end of the support door and having its downstream end pivotally mounted to the actuating arm of a linear actuator, whereby linear movement of the actuating arms in the upstream direction causes the blocker door to translate downstream along the second track while rotating radially inward and the outer door to simultaneously translate downstream along the beam track.

* * * * *